US009361833B2

(12) United States Patent
Kamhi (10) Patent No.: US 9,361,833 B2
(45) Date of Patent: Jun. 7, 2016

(54) EYE TRACKING BASED SELECTIVELY BACKLIGHTING A DISPLAY

(75) Inventor: Gila Kamhi, Zichron Yaakov (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/977,487

(22) PCT Filed: Apr. 12, 2012

(86) PCT No.: PCT/US2012/033196
§ 371 (c)(1),
(2), (4) Date: Jul. 7, 2014

(87) PCT Pub. No.: WO2013/154561
PCT Pub. Date: Oct. 17, 2013

(65) Prior Publication Data
US 2014/0313120 A1 Oct. 23, 2014

(51) Int. Cl.
*G09G 5/00* (2006.01)
*G09G 3/34* (2006.01)
*G06K 9/00* (2006.01)
*G06F 1/32* (2006.01)
*G06F 3/01* (2006.01)
*G09G 3/36* (2006.01)

(52) U.S. Cl.
CPC ............ *G09G 3/3406* (2013.01); *G06F 1/3265* (2013.01); *G06F 3/013* (2013.01); *G06K 9/00604* (2013.01); *G09G 3/36* (2013.01); *G09G 3/34* (2013.01); *G09G 2320/0626* (2013.01); *G09G 2330/021* (2013.01); *G09G 2354/00* (2013.01); *Y02B 60/1242* (2013.01)

(58) Field of Classification Search
CPC ............... G06F 3/005; G06F 3/011–3/013; G09G 3/34; G09G 3/3406–3/3426; G09G 2310/0237

USPC .......................................... 345/102, 156–158
See application file for complete search history.

(56) References Cited

U.S. PATENT DOCUMENTS

| 6,518,561 | B1 | 2/2003 | Miura |
| 6,890,077 | B2 | 5/2005 | Dunn |
| 2002/0141614 | A1* | 10/2002 | Lin .............................. 382/103 |
| 2003/0052903 | A1 | 3/2003 | Weast |
| 2006/0192775 | A1* | 8/2006 | Nicholson et al. ............ 345/211 |
| 2008/0111833 | A1 | 5/2008 | Thorn et al. |
| 2009/0040196 | A1 | 2/2009 | Duckstein et al. |
| 2010/0328333 | A1* | 12/2010 | Shi et al. ....................... 345/589 |

FOREIGN PATENT DOCUMENTS

| JP | H11-242733 | 9/1999 |
| JP | 2003-280805 A | 10/2003 |

(Continued)

OTHER PUBLICATIONS

International Search Report and Written opinion received for PCT Patent Application No. PCT/US2012/033196, mailed on Jan. 2, 2013, 9 Pages.
International Preliminary Report on Patentability for PCT/US2012/033196, mailed Oct. 23, 2014, 6 pages.
Supplementary European Search Report for European Patent Application No. EP 12874339, mailed Oct. 16, 2015, 8 pages.

(Continued)

*Primary Examiner* — Stephen Sherman
(74) *Attorney, Agent, or Firm* — Lynch Law Patent Group, P.C.

(57) ABSTRACT

Systems, apparatus, articles, and methods are described including operations for eye tracking based selective backlighting of a display.

23 Claims, 6 Drawing Sheets

(56) References Cited

FOREIGN PATENT DOCUMENTS

| | | |
|---|---|---|
| JP | 2008502990 A | 1/2008 |
| JP | 2008-209610 A | 9/2008 |
| JP | 2009237210 A | 10/2009 |
| WO | 2008056274 A1 | 5/2008 |

OTHER PUBLICATIONS

Notice of Preliminary Rejection for Korean Patent Application No. 10-2014-7026104, mailed Aug. 13, 2015, 5 pages.

Votive of Reason(s) for Rejection for Japanese Patent Application No. 2015-501649, mailed Dec. 1, 2015, 5 pages (with translation, 6 pages).

* cited by examiner

EYE TRACKING BASED SELECTIVELY BACKLIGHTING A DISPLAY

BACKGROUND

The display is typically a component that presents unique difficulties for power management. The display typically represents the largest power consumer after the central processing unit. The display exists solely for the purpose of user interaction and therefore it is only necessary when someone is looking at it. There are many times when a user may turn his attention away from a computer display, perhaps to answer a phone call or get a cup of coffee. There are also scenarios in which the display is only used briefly or not at all for a particular application. For example, someone using a computing device to play music may only interact with the device to select a song.

Therefore, efficient management of display lighting/dimming is typically based on a time-out scheme controlled by user explicit key-board/mouse inputs. Such time-out schemes are typically aimed at predicting the user's need of display via the usage of the computer.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones. etc. may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for eye tracking based selective backlighting of a display.

As described above, efficient management of display lighting/dimming is typically based on a time-out scheme controlled by user explicit key-board/mouse inputs. Such time-out schemes are typically aimed at predicting the user's need of display via the usage of the computer. This scheme may not be appropriate for some usages (e.g., especially the ones where the usage is passive, such as where the user does not need to provide explicit keyboard/mouse input for efficient usage). For example, a user reading an electronic book or examining a web page with complex content might experience the annoying behavior of the display dimming due to time-out due to keyboard or mouse inactivity. The same problem may exist for a user watching a video or an automated slide show. These are situations where the user interaction may be dependent on the display, but may not be tied to user interface input events.

Moreover, in several usage scenarios, the user looks at a very specific area on the screen (e.g., when reading a novel, an article via an eBook, or watching a video) where the user may only need to see only a small portion of the screen that is relevant to the reading or video watching experience. The region of interest in these cases may be reduced drastically based on the type or usage (e.g., only the lines that are currently being read in a novel or article may need to be backlit).

Methods for partial screen dimming (e.g., backlighting of only the portion of the screen that is being used) have been proposed, but they have not been widely adopted. For example, methods for partial screen dimming have been proposed based on mouse tracking. Such mouse tracking may not have been widely adopted since it requires physical input from the user in order to trigger the partial dimming to explicitly highlight the areas of interest (e.g., via mouse cursor).

As will be described in greater detail below, operations for selectively backlighting may utilize eye gaze tracking for implicit and accurate identification of the area of interest for partial backlighting (respectively, partial dimming). Additionally, dim the all or part of a display may be based on user gaze information mapped on the display. In other words, the user gaze may implicitly controls the dimming; thus, naturally backlighting only the area on the screen that the user is looking at. Usage of such gaze information is a more accurate means to determine the user activity in front of the computer than other conventional means (i.e. keyboard or mouse clicks), which may be misleading in several use cases (e.g., eBook reading or video watching). Additionally, user gaze information may be a more accurate means to determine which area of the screen to backlight, providing a more natural and user-friendly means for implementing a partial screen-dimming feature.

Implicit backlighting of areas of interest based on eye tracking may have several advantages. For example, such operations may extend the control of display dimming capability currently triggered by conventional timeout scheme, which is typically based on lack of user input (as interpreted by lack of keyboard/mouse inputs), via dimming the display based on an absence of user gaze on display. In some implementations, even if there is no explicit touch screen, keyboard, and/or mouse input given by the user (e.g., as might often be the case in eBook reading user experience), the display may not be dimmed if the user gaze is on the screen based on eye tracking. Such control of display dimming based on an absence of user gaze on display (instead of lack of user input for a predefined time period) may enhance the usability and also power savings. For example, power savings may be realized in cases where the display is dimmed based on an absence of user gaze prior to wait for the time-out period for dimming to expire (e.g., dimming immediately when user presence is not detected). Thus, such control may improve the usability of power management features by matching the dimming to user's own behavior instead of (or in addition to) predicting user's inactivity via a timeout scheme based on explicit inputs provided via touch screen, keyboard, and/or mouse.

Further, eye tracking may be utilized to extend the dimming capability by providing partial dimming of the display, e.g., backlighting only the area on the screen where the user gaze lays on. Moreover, power saving may be realized from backlighting only the area on the screen where the user gaze lays on. For example, the partial dimming of the display based on determination of the area that needs to be lighted via user gaze information may provide further power savings. Such gaze based partial dimming may overcome usability issues faced in implementations where the dimming/lighting was governed by the region around a cursor area. Gaze based partial dimming may provide the effect of utilizing gaze as an acute flashlight on the display, resulting in backlighting the area of interest (e.g. the lines that are being read). Such eye tracking based solutions are intuitive and do not request additional inputs from the user; instead, only the regions of the display that the user inherently looks at are lighted.

Additionally, such eye tracking based partial dimming provides new user experience. For example, the user can focus on what is being read or watched via lighting of only the areas of interest, which may assist in focusing the user's attention.

Figure 1:
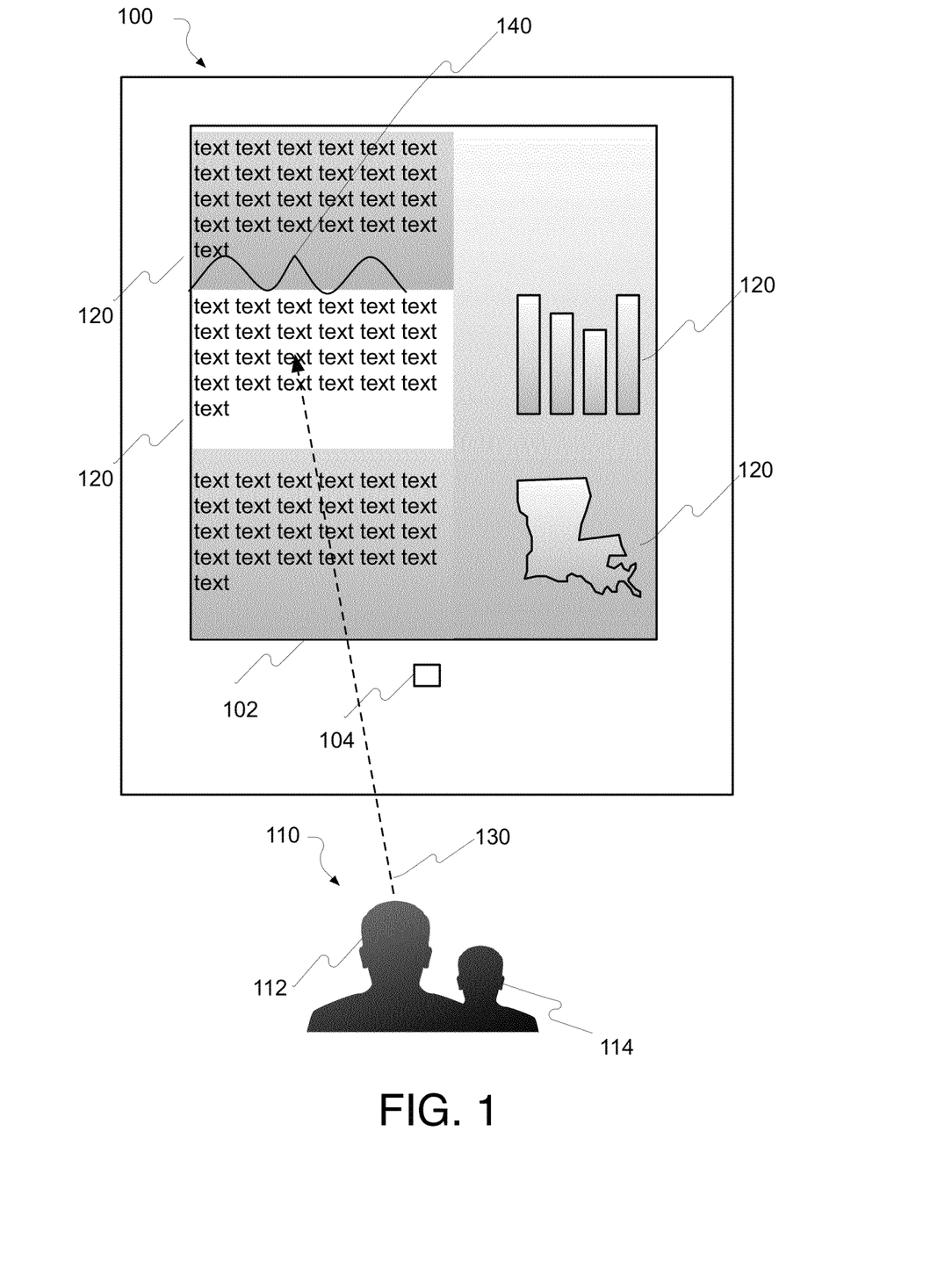
FIG. 1 is an illustrative diagram of an example backlight system.

FIG. 1 is an illustrative diagram of an example backlight system 100, arranged in accordance with at least some implementations of the present disclosure. In the illustrated implementation, backlight system 100 may include a display 102 and an imaging device 104. In some examples, backlight system 100 may include additional items that have not been shown in FIG. 1 for the sake of clarity. For example, backlight system 100 may include a processor, a radio frequency-type (RF) transceiver, and/or an antenna. Further, backlight system 100 may include additional items such as a speaker, a microphone, an accelerometer, memory, a router, network interface logic, etc. that have not been shown in FIG. 1 for the sake of clarity.

Imaging device 104 may be configured to capture visual data from one or more users 110 of backlight system 100. For example, imaging device 104 may be configured to capture visual data from a first user 112, a second user 114, from one or more additional users, the like, and/or combinations thereof. In some examples, imaging device 104 may be located on backlight system 100 so as to be capable of viewing users 110 while users 110 are viewing display 102.

In some examples, visual data of the first user may be captured via a camera sensor-type imaging device 104 or the like (e.g., a complementary metal oxide-semiconductor-type image sensor (CMOS) or a charge-coupled device-type image sensor (CCD)), without the use of a red-green-blue (RGB) depth camera and/or microphone-array to locate who is speaking. In other examples, an RGB-Depth camera and/or microphone-array might be used in addition to or in the alternative to the camera sensor. In some examples, imaging device 104 may be provided via either a peripheral eye tracking camera or as an integrated a peripheral eye tracking camera in backlight system 100.

In operation, backlight system 100 may utilize visual data inputs to be capable of determining which portions of display 102 to backlight. Accordingly, backlight system 100 may be capable of performing selective backlighting by leveraging visual information processing techniques. For example, backlight system 100 may receive visual data from imaging device 104 from one or more users 110. A determination may be made regarding which portions of display 102 to backlight based at least in part on the received visual data.

In some examples, such selective backlighting may include selectively backlighting an area of display 102 based at least in part on associating the region of interest with a discrete display element 120. As used herein the term "discrete display element" may refer to an identifiable and separate item being displayed. For example, discrete display element 120 may include a text box, a paragraph of text, a default number of text lines, a picture, a menu, the like, and/or combinations thereof. As illustrated, discrete display elements 120 might include several paragraphs of text and/or several pictures.

In some examples, eye tracking may be performed for at least one of the one or more users 110. For example, the eye tracking may be performed based at least in part on the received visual data 130. A region of interest 140 may be determined, where the region of interest may be associated with a portion of display 102 of the backlight system 100. For example, the determination of the region of interest 140 may be based at least in part on the performed eye tracking.

The portion of display 102 associated with the determined region of interest 140 may be selectively backlight and a secondary portion of the display that is not associated with the determined region of interest may be dimmed (e.g., as is illustrated via shading in FIG. 1).

In some examples, backlight system 100 may operate so that the selective backlighting includes selectively backlighting an area corresponding with region of interest 140 based at least in part on associating region of interest 140 with a discrete display element 120. Additionally or alternatively, backlight system 100 may operate so that the selective backlighting may include selectively backlighting an area corresponding with region of interest 140 based at least in part on a default area size. For example, an area corresponding with region of interest 140 might have a default shape and proportion, such as a default rectangular, oval or other shape.

In some examples, backlight system 100 may operate so that the selective backlighting includes turning off a previously lit portion of backlighting associated with the secondary portion of the display. Additionally or alternatively, backlight system 100 may operate so that the selective backlighting includes turning on a previously dimmed portion of backlighting associated with the portion of the display associated with the determined region of interest.

As will be discussed in greater detail below, backlight system 100 may be used to perform some or all of the various functions discussed below in connection with FIGS. 2 and/or 3.

Figure 2:
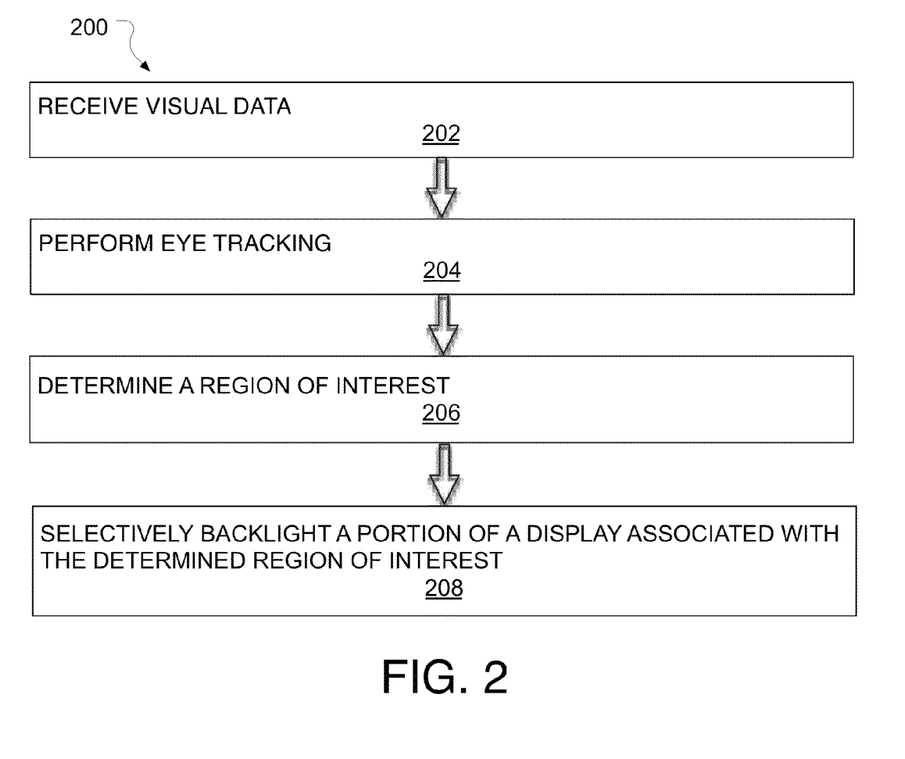
FIG. 2 is a flow chart illustrating an example selective backlighting process.
Figure 3:
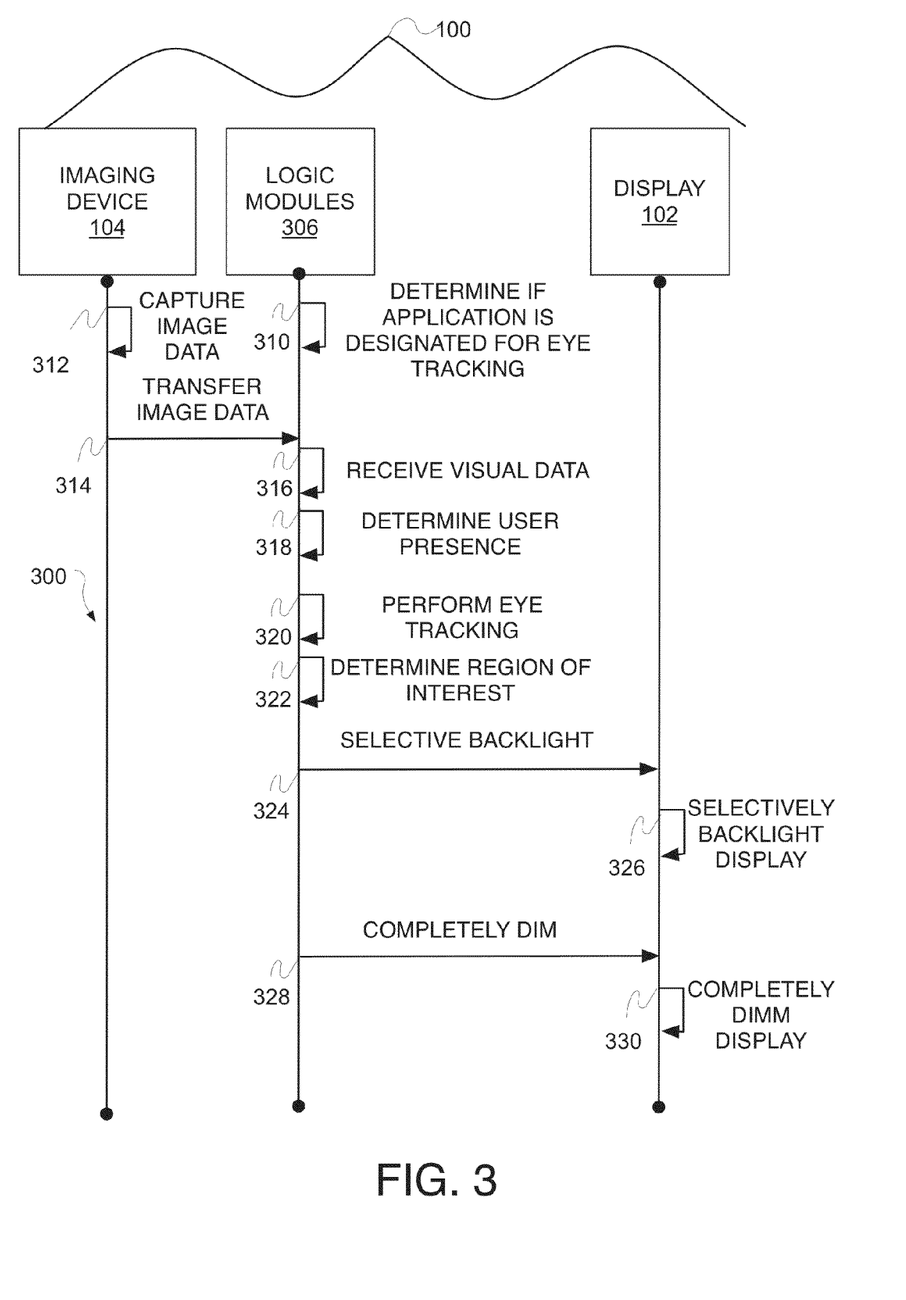
FIG. 3 is an illustrative diagram of an example backlight system in operation.
Figure 4:
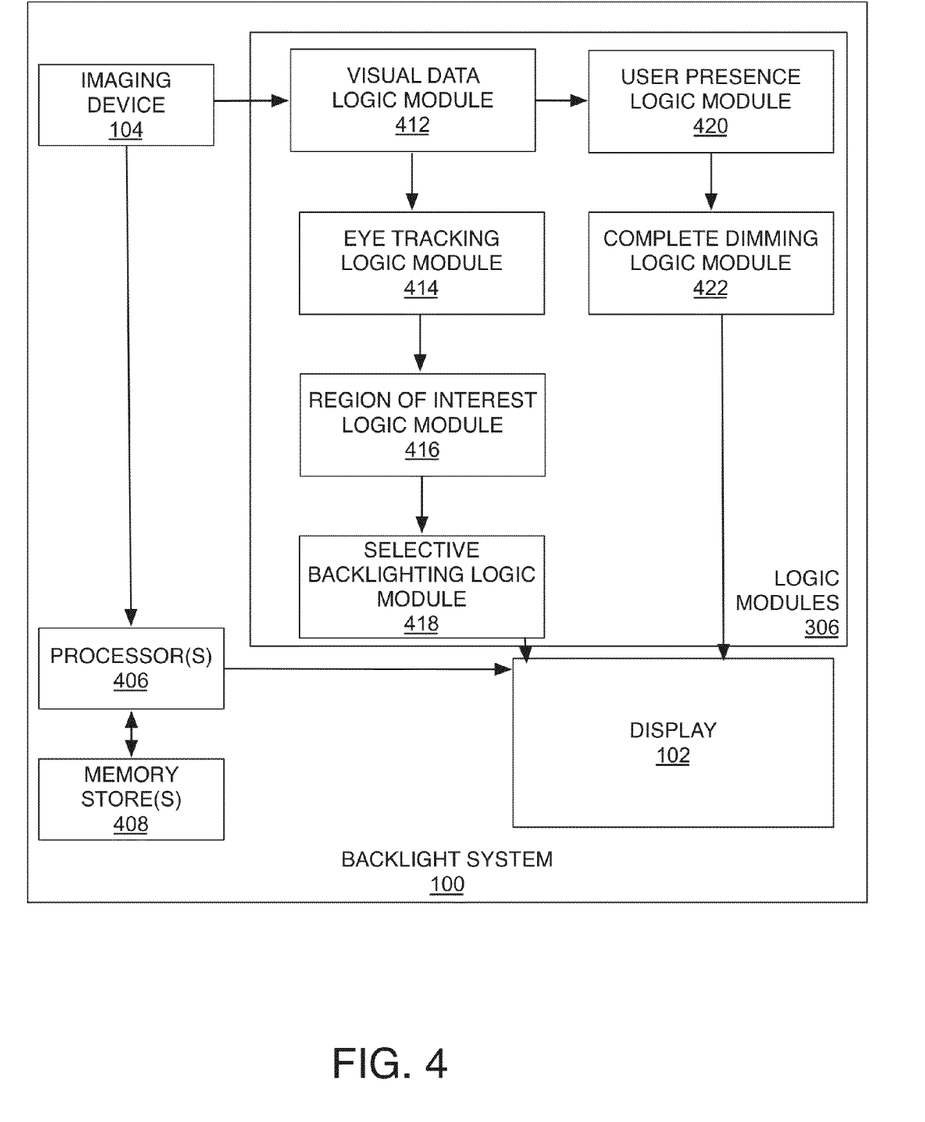
FIG. 4 is an illustrative diagram of an example backlight system.

FIG. 2 is a flow chart illustrating an example selective backlighting process 200, arranged in accordance with at least some implementations of the present disclosure. In the illustrated implementation, process 200 may include one or more operations, functions or actions as illustrated by one or more of blocks 202, 204, 206, and/or 208. By way of non-limiting example, process 200 will be described herein with reference to example backlight system 100 of FIGS. 1 and/or 4.

Process 200 may begin at block 202, "RECEIVE VISUAL DATA", where visual data may be received. For example, the received visual data may include video of one or more users.

Processing may continue from operation 202 to operation 204, "PERFORM EYE TRACKING", where eye tracking may be performed. For example, eye tracking may be performed for at least one of the one or more users based at least in part on the received visual data.

In some examples, such eye tracking may include tracking fixations and/or gazes. As used herein the term "gaze" may refer to a fleeting glance while the term "fixation" may refer to a sustained glance maintained for a time period longer than for that of a gaze.

Fixations are observations of a certain point in the visual field. This input, spanning about two degrees of the visual field, is the only input, which is processed with sharpness, clarity and accuracy. There are typically about three to four fixations per second, with duration of about two hundred to three hundred milliseconds each. For example, a fixation may include several closely grouped gaze points, where such gazes may typically have a duration of about seventeen milliseconds.

Saccades relocate the point of fixation. They are fast ballistic movements (i.e. the target is decided before initiation). They typically have amplitude of up to about twenty degrees and duration of about forty milliseconds (during which there is a suppression of the visual stimulus).

Fixations and saccades may be utilized for gathering and integrating visual information. They also reflect the intentions and cognitive states of a person.

In one example, gaze duration on a display element (e.g., word, sentence, specific column/row at a text area, and/or image) may be determined. For example, such gaze duration may be based on a determination of the proportion of time spent looking at a given display element.

In another example, such eye tracking may include determining the number of fixations on the area of interest for a given time window (e.g., the last minute), in relation to a given display element. For example, such fixations may illustrate the proportion of interest on the area of interest of the display element (e.g., word, sentence, specific column/row at a text area, and/or image) as compared to other areas in the text or display area. This metric may indicate the "importance" of the area to the viewer and may be directly related to a gaze rate.

In a further example, such eye tracking may include determining the number of gazes on the area of interest for a given time window. For example, such a determination of the number of gazes may illustrate the proportion of gazes on the area of interest of a display element as compared to other areas in the text or display area. The number of gazes can be measured as the concatenation of successive fixations within the area of interest (defining a display or text element) and provide an indication of the importance of the display item to a user, and may be used to trigger selective backlighting.

Processing may continue from operation 204 to operation 206, "DETERMINE A REGION OF INTEREST", where a region of interest may be determined. For example, the region of interest associated with a portion of the display of the computer system based at least in part on the performed eye tracking Processing may continue from operation 206 to operation 208, "SELECTIVELY BACKLIGHT THE PORTION OF THE DISPLAY ASSOCIATED WITH THE DETERMINED REGION OF INTEREST", where the portion of the display associated with the determined region of interest may be selectively backlit. For example, the portion of the display associated with the determined region of interest may be selectively backlit while a secondary portion of the display that is not associated with the determined region of interest may be selectively dimmed.

In operation, process 200 may utilize smart and context aware responses to user visual queues. For example, process 200 may be capable of telling where a user's attention is focused to responsively backlight only portions of a given display.

Some additional and/or alternative details related to process 200 may be illustrated in one or more examples of implementations discussed in greater detail below with regard to FIG. 3.

FIG. 3 is an illustrative diagram of example backlight system 100 and selective backlight process 300 in operation, arranged in accordance with at least some implementations of the present disclosure. In the illustrated implementation, process 300 may include one or more operations, functions or actions as illustrated by one or more of actions 310, 311, 312, 314, 316, 318, 320, 322, 324, 326, 328, and/or 330. By way of non-limiting example, process 300 will be described herein with reference to example backlight system 100 of FIGS. 1 and/or 4.

In the illustrated implementation, backlight system 100 may include display 102, imaging device 104, logic modules 306, the like, and/or combinations thereof. Although backlight system 100, as shown in FIG. 3, may include one particular set of blocks or actions associated with particular modules, these blocks or actions may be associated with different modules than the particular module illustrated here.

Process 300 may begin at block 310, "DETERMINE IF APPLICATION IS DESIGNATED FOR EYE TRACKING", where a determination may be made as to whether a given application has been designated for eye tracking. For example, an application currently being presented on display 102 may or may not have been designated for operation with eye tracking based selective dimming.

In some examples, given applications may have a default mode (e.g., eye tracking on or eye tracking off) that will enable the feature for all the applications, some categories of applications (e.g., text based applications may be defaulted to having eye tracking on while video based applications may be defaulted to having eye tracking off), or an application-by-application basis. Additionally or alternatively, user selection may be utilized to enable or disable the feature for all the applications, some categories of applications, or an application-by-application basis. For example, a user may be prompted to enable or disable the feature.

Processing may continue from operation 310 to operation 312, "CAPTURE IMAGE DATA", where image data may be captured. For example, capturing of image data may be performed via imaging device 104. In some examples, such capturing of image data may be performed in response to a determination at operation 310 that application currently being presented on display 102 has been designated for operation with eye tracking based selective dimming.

Processing may continue from operation 312 to operation 314, "TRANSFER IMAGE DATA", where image data may be transferred. For example, image data may be transferred from imaging device 104 to logic modules 306.

Processing may continue from operation 314 to operation 316. "RECEIVE VISUAL DATA", where visual data may be received. For example, the received visual data may include video of one or more users.

Processing may continue from operation 316 to operation 318, "DETERMINE USER PRESENCE", where the presence or non-presence of a user may be determined. For example, a determination may be made whether at least one of the one or more users is present based at least in part on the received visual data, where the determination of whether at least one of the one or more users is present occurs in response to the determination at operation 310 that the application has been designated for operation with eye tracking.

For example, process 300 may include facial detection, where a face of user may be detected. For example, the face of the one or more users may be detected, based at least in part on visual data. In some examples, such face detection may be configured to differentiate between the one or more users. Such facial detection techniques may allow relative accumulations to include face detection, eye tracking, landmark detection, face alignment, smile/blink/gender/age detection, face recognition, detecting two or more faces, and/or the like.

Processing may continue from operation 316 and/or 318 to operation 320, "PERFORM EYE TRACKING", where eye tracking may be performed. For example, eye tracking may be performed for at least one of the one or more users based at least in part on the received visual data. For example, the performance of eye tracking may occur in response to the determination at operation 318 that at least one of the one or more users is present, for at least one of the one or more users. Additionally or alternatively, the performance of eye tracking may occur in response to the determination at operation 310 that the application has been designated for operation with eye tracking.

Processing may continue from operation 320 to operation 322, "DETERMINE A REGION OF INTEREST", where a region of interest may be determined. For example, the region of interest associated with a portion of the display of the computer system may be based at least in part on the performed eye tracking.

Processing may continue from operation 322 to operation 324, "SELECTIVELY BACKLIGHT", where the portion of the display associated with the determined region of interest may be selectively backlit. For example, the portion of the display associated with the determined region of interest may be selectively backlit while a secondary portion of the display that is not associated with the determined region of interest may be selectively dimmed.

In some examples, process 300 may operate so that the selective backlighting includes selectively backlighting an area based at least in part on associating the region of interest with a discrete display element, where the discrete display element includes a text box, a paragraph of text, a default number of text lines, a picture, a menu, the like, and/or combinations thereof. For example, a backlighting area may be determined based on vicinity defined by a given radius circle centered at the location of the gaze, a predefined number of lines up and down from a central gaze location, a certain percentage area of the total display from a central gaze location, an entire paragraph of text, and entire image, or the like.

Processing may continue from operation 324 to operation 326. "SELECTIVELY BACKLIGHT DISPLAY", where display 102 may present a user with a selectively backlit portion of display 102. For example, the selective backlighting may include selectively backlighting an area based at least in part on a default area size. Additionally or alternatively, the selective backlighting may include selectively backlighting an area based at least in part on associating the region of interest with a discrete display element.

In some examples, operation 326 may operate so that the selective backlighting includes turning off a previously lit portion of backlighting associated with the secondary portion of the display. For example, in cases where the user's gaze is not on this region of display for a period of time, such a region may have its backlighting reduced or turned off. Additionally or alternatively, operation 326 may operate so that the selective backlighting includes turning on a previously dimmed portion of backlighting associated with the portion of the display associated with the determined region of interest.

Processing may continue from operation 326 to operation 328, "COMPLETELY DIM", where. For example, display 102 may be completely dimmed in response to the received visual data based at least in part on a determination at operation 318 that none of the one or more users is present. Additionally or alternatively, operation 328 may include completely dimming display 102 in response to the received visual data based at least in part on a determination at operation 320 that none of the one or more users eyes are directed at the display in response to the performed eye tracking.

Processing may continue from operation 328 to operation 330. "COMPLETELY DIM DISPLAY", where display 102 may be completely dimmed. For example, such complete dimming may include turning off of display 102 or partially dimming the entire display to a lowered light level.

In operation, process 300 may determine which applications will be registered to perform with partial dimming. Process 300 may determine an area to be selectively backlit by initially marking the full display 102 initially as region for backlighting and tracking a user's gaze when eye tracking is "on" for an active application (e.g., an application that is on the foreground of the system 100) and it is determined that a user is present. Process 300 may compute gaze data (e.g. x,y coordinates of gaze on display 102 and an associated time stamp of the gaze). In cases where the x,y coordinates of the gaze are within the region of the displayed application a region of backlighting may be determined and a partial dim function may turn-off previous backlighting based on gaze history on display 102.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 2 and 3 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware" as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

FIG. 4 is an illustrative diagram of an example backlight system 100, arranged in accordance with at least some implementations of the present disclosure. In the illustrated implementation, backlight system 100 may include display 102, imaging device 104, and/or logic modules 306. Logic modules 306 may include a visual data logic module 412, an eye tracking logic module 414, a region of interest logic module 416, a selective backlighting logic module 418, a user presence logic module 420, a complete dimming logic module 422, the like, and/or combinations thereof. As illustrated, display 102, imaging device 104, processor 402 and/or memory store 404 may be capable of communication with one another and/or communication with portions of logic modules 306. Although backlight system 100, as shown in FIG. 4, may include one particular set of blocks or actions associated with particular modules, these blocks or actions may be associated with different modules than the particular module illustrated here.

In some examples, imaging device 104 may be configured to capture visual data. Processors 402 may be communicatively coupled to display 102 and to imaging device 104. Memory stores 404 may be communicatively coupled to processors 402. Visual data logic module 412, eye tracking logic module 414, region of interest logic module 416, selective backlighting logic module 418, user presence logic module 420, and/or complete dimming logic module 422 may be communicatively coupled to processors 402 and/or memory stores 404.

In some examples, visual data logic module 412 may be configured to receive visual data, where the visual data includes video of one or more users. Eye tracking logic module 414 may be configured to perform eye tracking for at least one of the one or more users based at least in part on the received visual data. Region of interest logic module 416 may be configured to determine a region of interest associated with a portion of display 102 based at least in part on the performed eye tracking. Selective backlighting logic module 418 may be configured to selectively backlight the portion of display 102 associated with the determined region of interest and dim a secondary portion of display 102 that is not associated with the determined region of interest.

In some examples, logic modules 306 may include user presence logic module 420 that may be configured to determine whether at least one of the one or more users is present based at least in part on the received visual data. For example, the determination of whether at least one of the one or more users is present may occur in response to a determination that the application has been designated for operation with eye tracking. In some examples, the performance of eye tracking via eye tracking logic module 414 may occur in response to the determination that at least one of the one or more users is present, for at least one of the one or more users.

In some examples, logic modules 306 may include complete dimming logic module 422 that may be configured to completely dim display 102 in response to the received visual data. For example, complete dimming logic module 422 may be configured to completely dim display 102 based at least in part on a determination via user presence logic module 420 that none of the one or more users is present. Additionally or alternatively, complete dimming logic module 422 may be configured to completely dim display 102 based at least in part on a determination via eye tracking logic module 414 that none of the one or more users eyes are directed at the display in response to the performed eye tracking.

In various embodiments, selective backlighting logic module 418 and/or complete dimming logic module 422 may be implemented in hardware, while software may implement visual data logic module 412, eye tracking logic module 414, region of interest logic module 416, and/or user presence logic module 420. For example, in some embodiments, selective backlighting logic module 418 and/or complete dimming logic module 422 may be implemented by ASIC logic while visual data logic module 412, eye tracking logic module 414, region of interest logic module 416, and/or user presence logic module 420 may be provided by software instructions executed by logic such as processors 406. However, the present disclosure is not limited in this regard and eye tracking logic module 414, region of interest logic module 416, selective backlighting logic module 418, user presence logic module 420, and/or complete dimming logic module 422 may be implemented by any combination of hardware, firmware and/or software. In addition, memory stores 408 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 408 may be implemented by cache memory.

Figure 5:
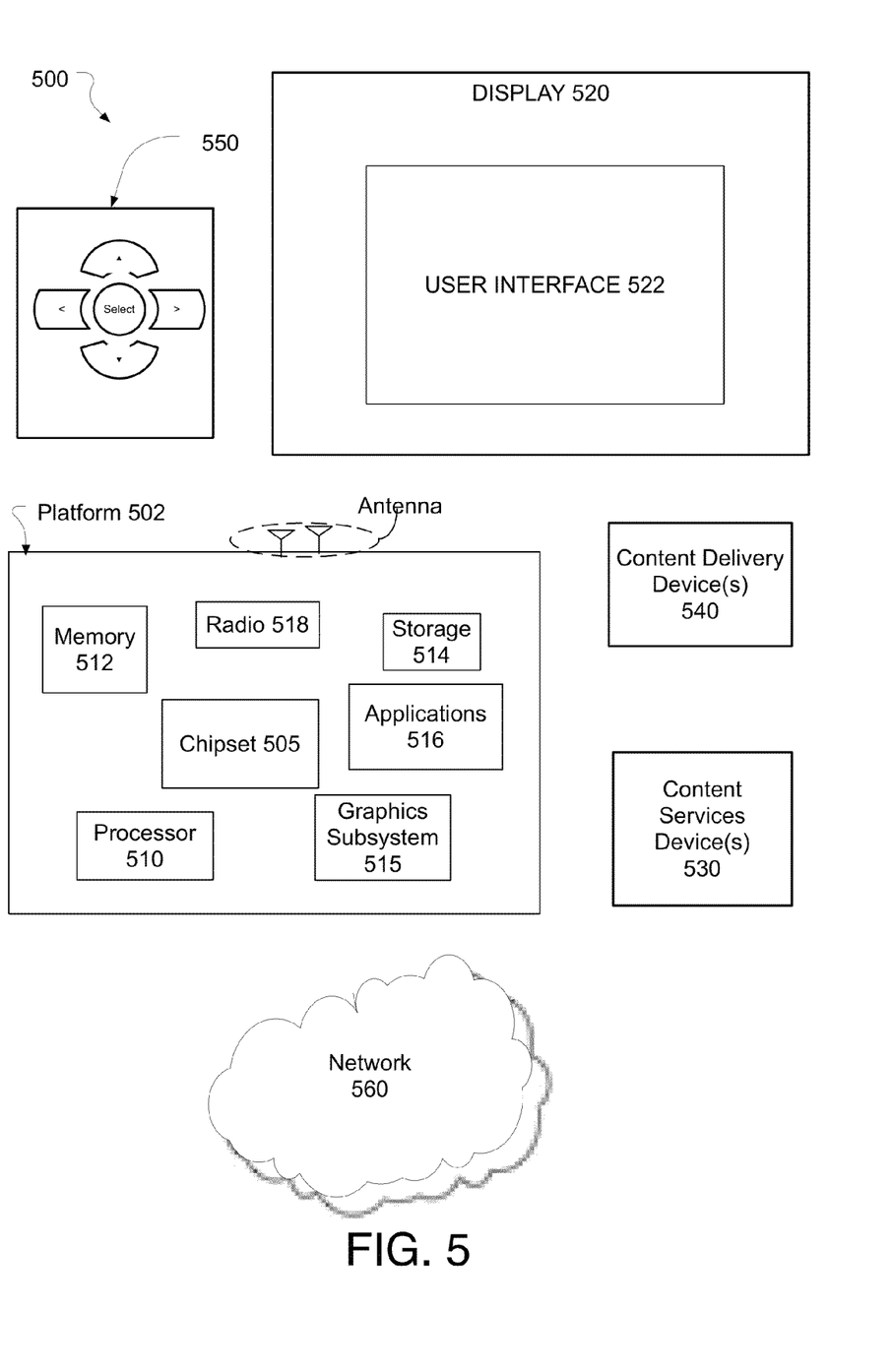
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g. send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g. continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
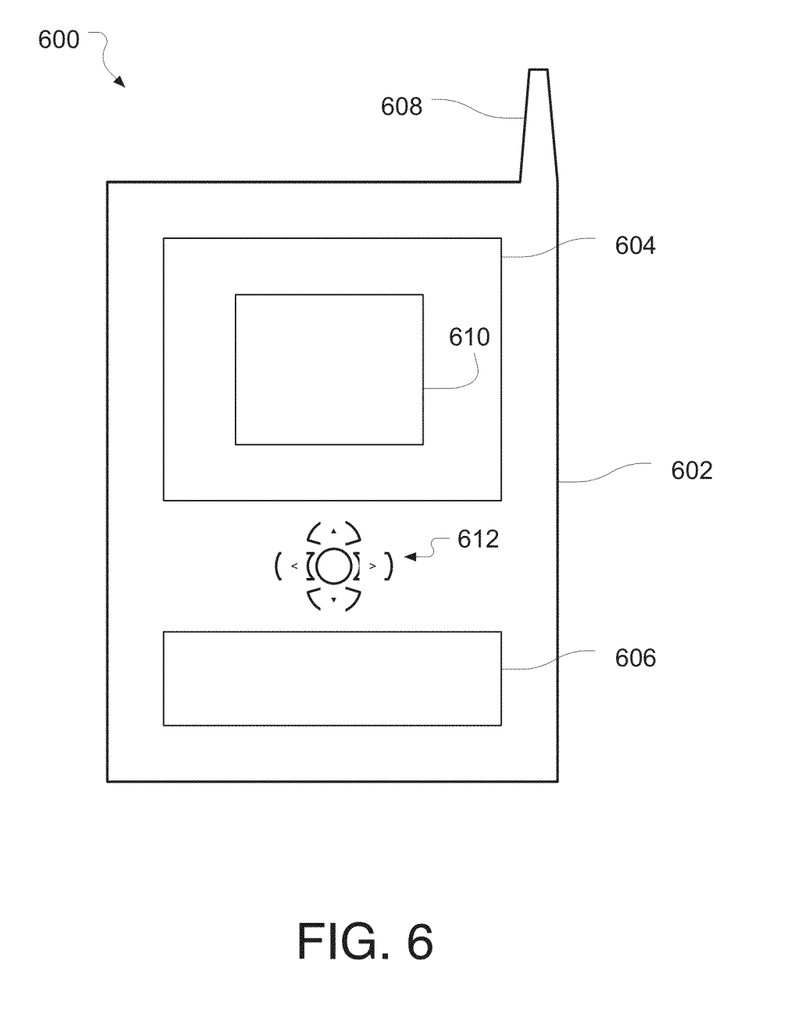
FIG. 6 is an illustrative diagram of an example system, all arranged in accordance with at least some implementations of the present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for selectively backlighting a display of a computer may include reception of visual data, where the visual data may include video of one or more users. Eye tracking may be performed for at least one of the one or more users. For example, the eye tracking may be performed based at least in part on the received visual data. A region of interest may be determined, where the region of interest may be associated with a portion of the display of the computer system. For example, the determination of the region of interest may be based at least in part on the performed eye tracking. The portion of the display associated with the determined region of interest may be selectively backlight and a secondary portion of the display that is not associated with the determined region of interest may be dimmed.

In some examples, the method may include determining whether an application has been designated for operation with eye tracking. A determination may be made whether at least one of the one or more users is present based at least in part on the received visual data, where the determination of whether at least one of the one or more users is present occurs in response to the determination that the application has been designated for operation with eye tracking.

In some examples, the method may include determining whether at least one of the one or more users is present based at least in part on the received visual data. For example, the performance of eye tracking may occur in response to the determination that at least one of the one or more users is present, for at least one of the one or more users.

In some examples, the method may include determining whether an application has been designated for operation with eye tracking. A determination may be made whether at least one of the one or more users is present based at least in part on the received visual data, where the determination of whether at least one of the one or more users is present may occur in response to the determination that the application has been designated for operation with eye tracking. For example, the performance of eye tracking may occur in response to the determination that at least one of the one or more users is present, for at least one of the one or more users.

In some examples, the method may operate so that the selective backlighting includes selectively backlighting an area based at least in part on a default area size.

In some examples, the method may operate so that the selective backlighting includes selectively backlighting an area based at least in part on associating the region of interest with a discrete display element, where the discrete display element includes a text box, a paragraph of text, a default number of text lines, a picture, a menu, the like, and/or combinations thereof.

In some examples, the method may operate so that the selective backlighting includes turning off a previously lit portion of backlighting associated with the secondary portion of the display.

In some examples, the method may operate so that the selective backlighting includes turning on a previously dimmed portion of backlighting associated with the portion of the display associated with the determined region of interest.

In some examples, the method may include determining whether at least one of the one or more users is present based at least in part on the received visual data. The display may be completely dimmed in response to the received visual data based at least in part on a determination that none of the one or more users is present.

In some examples, the method may include completely dimming the display in response to the received visual data based at least in part on a determination that none of the one or more users eyes are directed at the display in response to the performed eye tracking.

In some examples, the method may include determining whether an application has been designated for operation with eye tracking. A determination may be made whether at least one of the one or more users is present based at least in part on the received visual data. For example, the determination of whether at least one of the one or more users is present may occur in response to the determination that the application has been designated for operation with eye tracking. The display may be completely dimmed in response to the received visual data based at least in part on a determination that none of the one or more users is present and/or on a determination that none of the one or more users eyes are directed at the display in response to the performed eye tracking. The performance of eye tracking may occur in response to the determination that at least one of the one or more users is present, for at least one of the one or more users. The selective backlighting may include selectively backlighting an area based at least in part on a default area size and/or selectively backlighting an area based at least in part on associating the region of interest with a discrete display element, where the discrete display element may include a text box, a paragraph of text, a default number of text lines, a picture, a menu, the like, and/or combinations thereof. The selective backlighting may include turning off a previously lit portion of backlighting associated with the secondary portion of the display and/or turning on a previously dimmed portion of backlighting associated with the portion of the display associated with the determined region of interest.

In other examples, a system for selectively backlighting a computer, may include a display, an imaging device, one or more processors, one or more memory stores, a visual data logic module, an eye tracking logic module, a region of interest logic module, a selective backlighting logic module, the like, and/or combinations thereof. The imaging device may be configured to capture visual data. The one or more processors may be communicatively coupled to the display and to the imaging device. The one or more memory stores may be communicatively coupled to the one or more processors. The visual data logic module may be communicatively coupled to the one or more processors and the one or more memory stores and may be configured to receive visual data, where the visual data includes video of one or more users. The eye tracking logic module may be communicatively coupled to the one or more processors and the one or more memory stores and may be configured to perform eye tracking for at least one of the one or more users based at least in part on the received visual data. The region of interest logic module may be communicatively coupled to the one or more processors and the one or more memory stores and may be configured to determine a region of interest associated with a portion of the display based at least in part on the performed eye tracking. The selective backlighting logic module may be communicatively coupled to the one or more processors and the one or more memory stores and may be configured to selectively backlight the portion of the display associated with the determined region of interest and dim a secondary portion of the display that is not associated with the determined region of interest.

In some examples, the system may include a user presence logic module that may be communicatively coupled to the one or more processors and the one or more memory stores and that may be configured to determine whether at least one of the one or more users is present based at least in part on the received visual data, where the determination of whether at least one of the one or more users is present may occur in response to a determination that the application has been designated for operation with eye tracking.

In some examples, the system may include a user presence logic module that may be communicatively coupled to the one or more processors and the one or more memory stores and that may be configured to determine whether at least one of the one or more users is present based at least in part on the received visual data, where the performance of eye tracking may occur in response to the determination that at least one of the one or more users is present, for at least one of the one or more users.

In some examples, the system may include a user presence logic module that may be communicatively coupled to the one or more processors and the one or more memory stores and that may be configured to determine whether at least one of the one or more users is present based at least in part on the received visual data, where the determination of whether at least one of the one or more users is present may occur in response to a determination that the application has been designated for operation with eye tracking. The performance of eye tracking may occur in response to the determination that at least one of the one or more users is present, for at least one of the one or more users.

In some examples, the system may operate so that the selective backlighting includes selectively backlighting an area based at least in part on a default area size.

In some examples, the system may operate so that the selective backlighting includes selectively backlighting an area based at least in part on associating the region of interest with a discrete display element, where the discrete display element includes a text box, a paragraph of text, a default number of text lines, a picture, a menu, the like, and/or combinations thereof.

In some examples, the system may operate so that the selective backlighting includes turning off a previously lit portion of backlighting associated with the secondary portion of the display.

In some examples, the system may operate so that the selective backlighting includes turning on a previously dimmed portion of backlighting associated with the portion of the display associated with the determined region of interest.

In some examples, the system may include a complete dimming logic module that may be communicatively coupled to the one or more processors and the one or more memory stores and that may be configured to completely dim the display in response to the received visual data based at least in part on a determination that none of the one or more users is present.

In some examples, the system may include a complete dimming logic module that may be communicatively coupled to the one or more processors and the one or more memory stores and that may be configured to completely dim the display in response to the received visual data based at least in part on a determination that none of the one or more users eyes are directed at the display in response to the performed eye tracking.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for selectively backlighting a display of a computer, comprising:
   receiving visual data, wherein the visual data includes video of one or more users;
   performing eye tracking for at least one of the one or more users based at least in part on the received visual data;
   determining a region of interest associated with a portion of the display of the computer system based at least in part on the performed eye tracking; and
   selectively backlighting the portion of the display associated with the determined region of interest and dimming a secondary portion of the display that is not associated with the determined region of interest;
   determining whether or not an application has been selectively designated for operation with eye tracking; and
   determining whether or not at least one of the one or more users is present based at least in part on the received visual data, wherein the determination of whether or not at least one of the one or more users is present occurs in response to the determination that the application has been selectively designated for operation with eye tracking.

2. The method of claim 1,
   wherein the selective backlighting comprises selectively backlighting an area based at least in part on associating the region of interest with a discrete display element, wherein the discrete display element comprises a paragraph of text and/or a default number of text lines.

3. The method of claim 1, further comprising:
   determining whether or not at least one of the one or more users is present based at least in part on the received visual data, and wherein the performance of eye tracking occurs in response to the determination that at least one of the one or more users is present, for at least one of the one or more users.

4. The method of claim 1, further comprising:
determining whether or not an application has been designated for operation with eye tracking; and
determining whether or not at least one of the one or more users is present based at least in part on the received visual data, wherein the determination of whether or not at least one of the one or more users is present occurs in response to the determination that the application has been designated for operation with eye tracking,
wherein the performance of eye tracking occurs in response to the determination that at least one of the one or more users is present, for at least one of the one or more users.

5. The method of claim 1, wherein the selective backlighting comprises selectively backlighting an area based at least in part on a default area size.

6. The method of claim 1, wherein the selective backlighting comprises selectively backlighting an area based at least in part on associating the region of interest with a discrete display element, wherein the discrete display element comprises a text box, a paragraph of text, a default number of text lines, a picture, and/or a menu.

7. The method of claim 1, wherein the selective backlighting comprises turning off a previously lit portion of backlighting associated with the secondary portion of the display.

8. The method of claim 1, wherein the selective backlighting comprises turning on a previously dimmed portion of backlighting associated with the portion of the display associated with the determined region of interest.

9. The method of claim 1, further comprising:
determining whether or not at least one of the one or more users is present based at least in part on the received visual data, and
completely dimming the display in response to the received visual data based at least in part on a determination that none of the one or more users is present.

10. The method of claim 1, further comprising:
completely dimming the display in response to the received visual data based at least in part on a determination that none of the one or more users eyes are directed at the display in response to the performed eye tracking.

11. The method of claim 1, further comprising:
completely dimming the display in response to the received visual data based at least in part on a determination that none of the one or more users is present and/or on a determination that none of the one or more users eyes are directed at the display in response to the performed eye tracking, and
wherein the performance of eye tracking occurs in response to the determination that at least one of the one or more users is present, for at least one of the one or more users,
wherein the selective backlighting comprises selectively backlighting an area based at least in part on a default area size and/or selectively backlighting an area based at least in part on associating the region of interest with a discrete display element, wherein the discrete display element comprises a text box, a paragraph of text, a default number of text lines, a picture, and/or a menu,
wherein the selective backlighting comprises turning off a previously lit portion of backlighting associated with the secondary portion of the display and/or turning on a previously dimmed portion of backlighting associated with the portion of the display associated with the determined region of interest.

12. A system for selectively backlighting a computer, comprising:
a display;
an imaging device configured to capture visual data;
one or more processors communicatively coupled to the display and to the imaging device;
one or more memory stores communicatively coupled to the one or more processors;
a visual data logic module communicatively coupled to the one or more processors and the one or more memory stores and configured to receive visual data, wherein the visual data includes video of one or more users;
an eye tracking logic module communicatively coupled to the one or more processors and the one or more memory stores and configured to perform eye tracking for at least one of the one or more users based at least in part on the received visual data;
a region of interest logic module communicatively coupled to the one or more processors and the one or more memory stores and configured to determine a region of interest associated with a portion of the display based at least in part on the performed eye tracking;
a selective backlighting logic module communicatively coupled to the one or more processors and the one or more memory stores and configured to selectively backlight the portion of the display associated with the determined region of interest and dim a secondary portion of the display that is not associated with the determined region of interest; and
a user presence logic module communicatively coupled to the one or more processors and the one or more memory stores and configured to determine whether or not at least one of the one or more users is present based at least in part on the received visual data, wherein the determination of whether or not at least one of the one or more users is present occurs in response to a determination that the application has been selectively designated for operation with eye tracking.

13. The system of claim 12,
wherein the selective backlighting comprises selectively backlighting an area based at least in part on associating the region of interest with a discrete display element, wherein the discrete display element comprises a paragraph of text and/or a default number of text lines.

14. The system of claim 12, further comprising:
a user presence logic module communicatively coupled to the one or more processors and the one or more memory stores and configured to determine whether or not at least one of the one or more users is present based at least in part on the received visual data, and
wherein the performance of eye tracking occurs in response to the determination that at least one of the one or more users is present, for at least one of the one or more users.

15. The system of claim 12, further comprising:
a user presence logic module communicatively coupled to the one or more processors and the one or more memory stores and configured to determine whether or not at least one of the one or more users is present based at least in part on the received visual data, wherein the determination of whether or not at least one of the one or more users is present occurs in response to a determination that the application has been designated for operation with eye tracking, wherein the performance of eye tracking occurs in response to the determination that at least one of the one or more users is present, for at least one of the one or more users.

16. The system of claim 12, wherein the selective backlighting comprises selectively backlighting an area based at least in part on a default area size.

17. The system of claim 12, wherein the selective backlighting comprises selectively backlighting an area based at least in part on associating the region of interest with a discrete display element, wherein the discrete display element comprises a text box, a paragraph of text, a default number of text lines, a picture, and/or a menu.

18. The system of claim 12, wherein the selective backlighting comprises turning off a previously lit portion of backlighting associated with the secondary portion of the display.

19. The system of claim 12, wherein the selective backlighting comprises turning on a previously dimmed portion of backlighting associated with the portion of the display associated with the determined region of interest.

20. The system of claim 12, further comprising:
a complete dimming logic module communicatively coupled to the one or more processors and the one or more memory stores and configured to completely dim the display in response to the received visual data based at least in part on a determination that none of the one or more users is present.

21. The system of claim 12, further comprising:
a complete dimming logic module communicatively coupled to the one or more processors and the one or more memory stores and configured to completely dim the display in response to the received visual data based at least in part on a determination that none of the one or more users eyes are directed at the display in response to the performed eye tracking.

22. At least one non-transitory machine readable medium comprising a plurality of instructions that in response to being executed on a computing device, cause the computing device to code data by:
receiving visual data, wherein the visual data includes video of one or more users;
performing eye tracking for at least one of the one or more users based at least in part on the received visual data;
determining a region of interest associated with a portion of the display of the computer system based at least in part on the performed eye tracking; and
selectively backlighting the portion of the display associated with the determined region of interest and dimming a secondary portion of the display that is not associated with the determined region of interest;
determining whether or not an application has been selectively designated for operation with eye tracking; and
determining whether or not at least one of the one or more users is present based at least in part on the received visual data, wherein the determination of whether or not at least one of the one or more users is present occurs in response to the determination that the application has been selectively designated for operation with eye tracking.

23. The non-transitory machine readable medium of claim 22, further comprising instructions that in response to being executed on the computing device, cause the computing device to operate by:
completely dimming the display in response to the received visual data based at least in part on a determination that none of the one or more users is present and/or on a determination that none of the one or more users eyes are directed at the display in response to the performed eye tracking, and
wherein the performance of eye tracking occurs in response to the determination that at least one of the one or more users is present, for at least one of the one or more users,
wherein the selective backlighting comprises selectively backlighting an area based at least in part on a default area size and/or selectively backlighting an area based at least in part on associating the region of interest with a discrete display, element, wherein the discrete display element comprises a text box, a paragraph of text, a default number of text lines, a picture, and/or a menu,
wherein the selective backlighting comprises turning off a previously Ht portion of backlighting associated with the secondary portion of the display and/or turning on a previously dimmed portion of backlighting associated with the portion of the display associated with the determined region of interest.

* * * * *